Sept. 9, 1941.    J. A. H. BARKEIJ    2,255,738
POWER TRANSMISSION
Filed Jan. 13, 1938    3 Sheets-Sheet 3

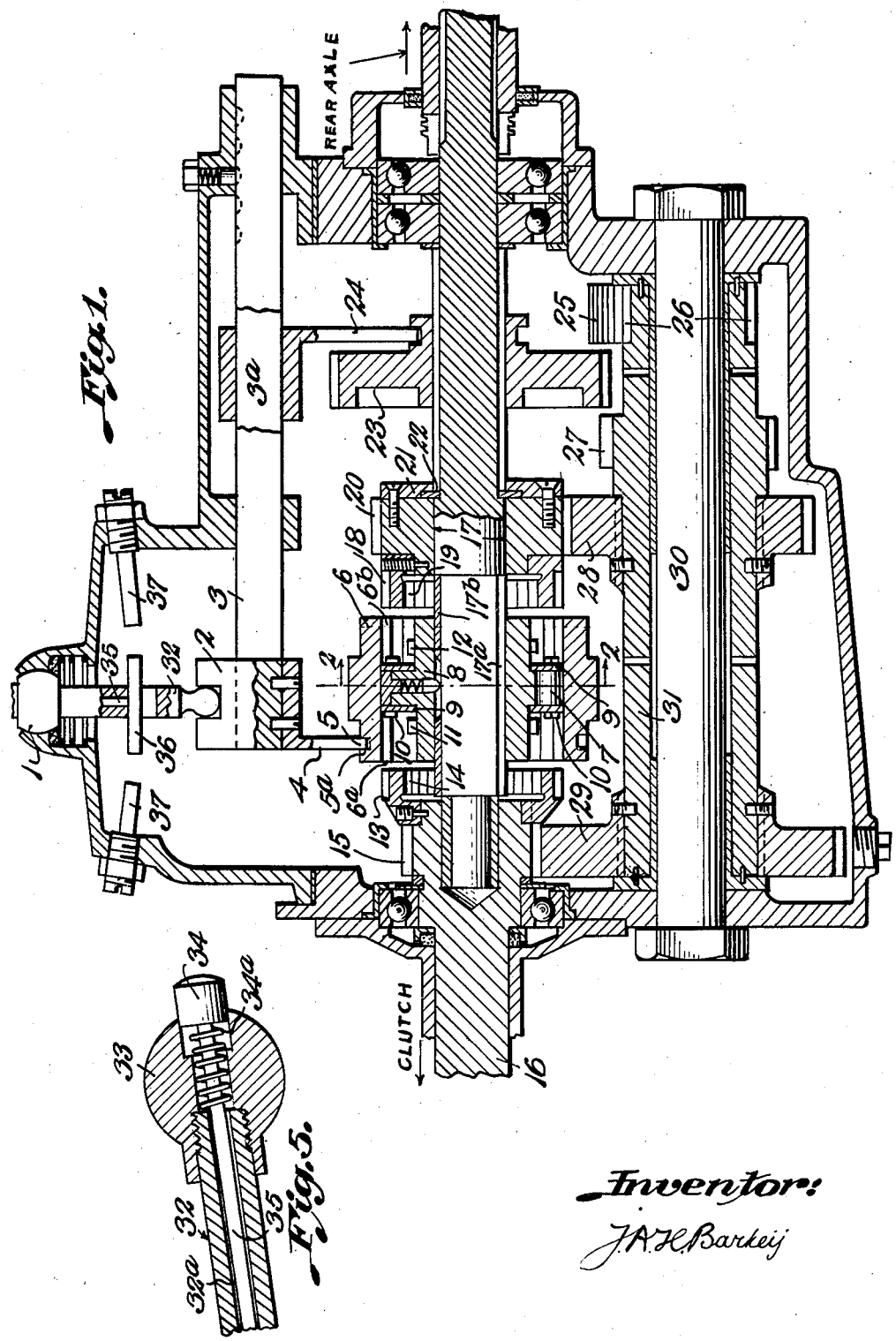

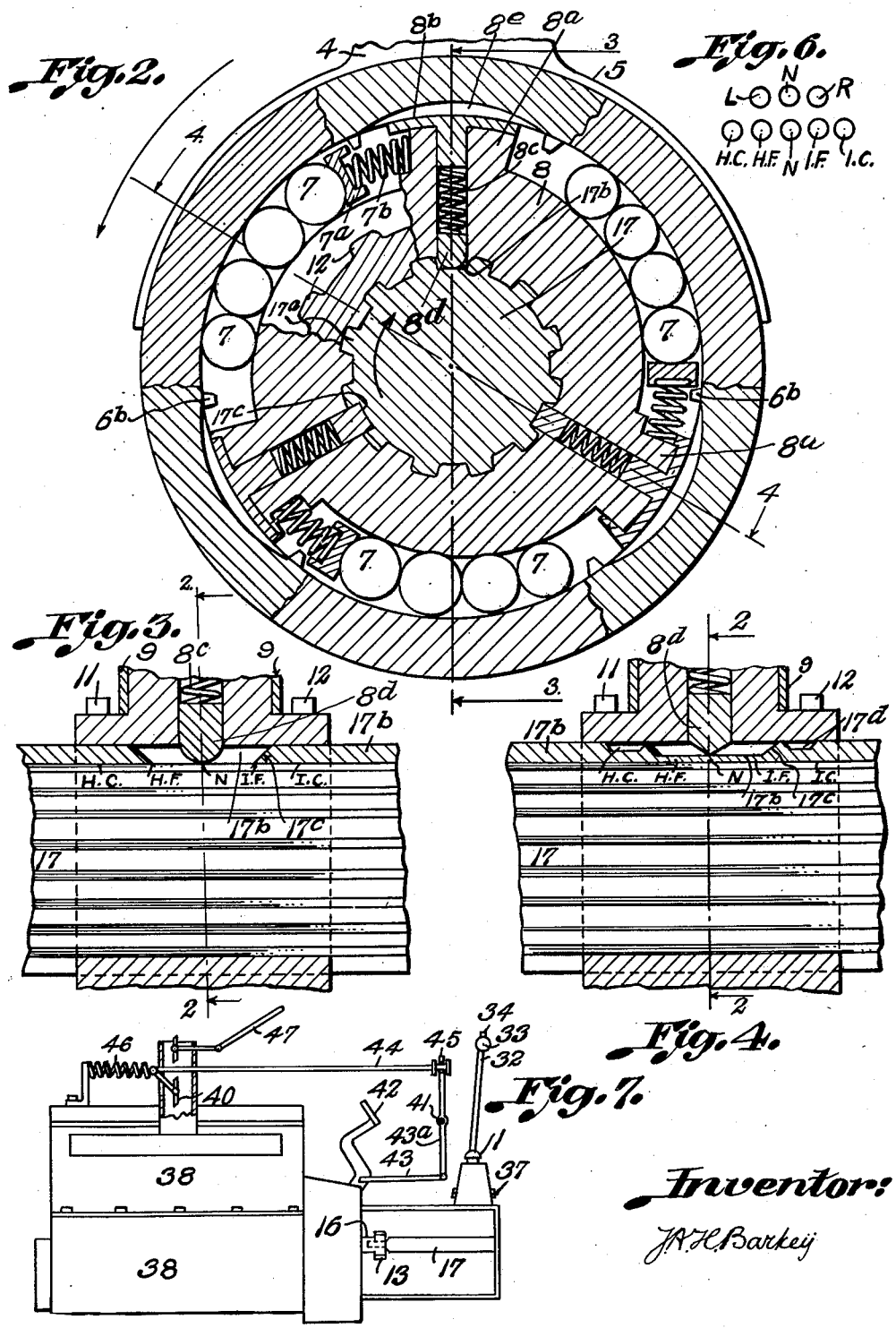

INVENTOR.
J.A.H.Barkeij

Patented Sept. 9, 1941

2,255,738

UNITED STATES PATENT OFFICE 2,255,738

POWER TRANSMISSION

Jean A. H. Barkeij, Altadena, Calif.

Application January 13, 1938, Serial No. 184,904

20 Claims. (Cl. 192—48)

My invention relates more particularly to transmission mechanism for automobiles and trucks, involving means for driving the propeller shaft, connected with the rear axle and wheels, at different speeds forwards and backwards under the control of the operator.

The present invention is a continuation of the principle explained in my Patent 1,541,240 and application 493,458, Nov. 4, 1930. In said patent it is proposed to reduce the rotational speed of the gears in the gear box, to free these gears from both ends, from the engine and from the rear axle. This principle is further continued and claimed in my application No. 551,980, now Patent No. 2,181,541 dated Nov. 28, 1939, filed July 20, 1931.

The overrunning clutch is well known in the art, and as these clutches transmit power only in one direction, it is logical to locate this free wheel clutch beyond the reverse gears, so that the car can be backed up without placing said free wheel out of commission. In the present arrangement this clutch is placed between the high and intermediate gears on the clutch shaft and the transmission shaft.

My first object is to have enough friction in said free wheel so that the transmission shaft takes the shiftable clutch members, located in a ring around the rollers in said free wheel, along in its rotation, so that said ring may change its rotational speed, when the teeth on said ring engage the teeth of the gear wheel on the clutch shaft, or the teeth of the gear wheel on the transmission shaft.

My second object is to provide additional friction between said outer ring of the free wheel and the inner core thereof, which is splined on the transmission shaft, said means being actuated by the gear shift lever prior to the solid drive in high or intermediate gear.

My third object is to provide additional friction between said outer ring, around the free wheel rollers, and the inner core, splined on the transmission shaft, prior to the shift into solid drive i. e. in high or intermediate gear, and to decrease said friction about at the moment that said solid high or intermediate gear is engaged. I mean hereby that the synchronised parts are either partially released as shown in the Fig. 4, or entirely released as shown in Figs. 8 and 9. The partial release falls in fact under the said third object just as well as the complete release, because with decrease of friction is meant that the ring 6 should be rotatable with respect to the inner ring 8 so that the tooth means 11 and 12 may engage the respective tooth means 14 and 19, on the drive shaft and second gear drive respectively. With partial release is in fact only meant that the rings 8 and 6 are rotatable with respect with each other prior to the meeting and meshing of said tooth means so that the necessary small adjustment to engage said teeth takes place actually when the teeth to be meshed on the various parts may touch each other slightly, and said touch would be sufficient to shift ring 6 circumferentially with respect to ring 8 and reversely. And this cannot be done unless rings 6 and 8 are partially or substantially released from each other by freeing the friction of the shoes 8b from the ring 6, already meshed either with the drive shaft 16 or the gear wheel 18, 20.

My fourth object is to attain the last two objects by means of the smallest number of parts and the least complication, thereby effecting synchronisation or equalised rotational speed between four sets of clutch teeth prior to meshing them.

Although only a single arrangement has been shown, it is understood that the last three objects may be obtained in gear boxes, in which more than one free wheel is applied, as shown in my application No. 493,458, Nov. 4, 1930, or in any other arrangement patented or to be patented, in which a similar free wheel is applied.

Referring to the accompanying drawings,

Fig. 1 is a vertical section of a gear box of an automobile, showing about the standard arrangement except for the application of a free wheel on the transmission, to effect free wheeling for high and intermediate drive.

Fig. 2 is a vertical section on a larger scale of said free wheel, and the means to effect equal rotational speed between clutch members to be meshed before the engagement of said clutch members (see section line 2—2 in Fig. 1).

Fig. 3 shows Fig. 2 on the section line 3—3, and Fig. 2 shows Fig. 3 on the section line 2—2.

Fig. 4 shows Fig. 2 on the section line 4—4. Fig. 2 is partly (lower part) Fig. 4 on the section line 2—2.

Fig. 5 shows an additional feature to the standard of gear shift lever, which is optional, to feel the relative positions of the shiftable clutch unit for solid drive and free wheel drive, high or second gear.

Fig. 6 shows the 5 different positions of the gear shift fork, on the gear shift shaft 3 for high and intermediate drive, and shows the three positions for the gear shift fork for low, neutral and reverse gear on the second gear shift shaft 3a, located behind said first gear shift shaft, as shown in Fig. 1. The positions of the other end of the gear shift lever i. e. the knob 33, shown in Fig. 5, will be in reverse positions, of course, on account of the fulcrum 1 in Fig. 1.

Fig. 7 is a view, largely diagrammatic, of an engine, clutch and change speed gear illustrating certain details.

Figure 8:
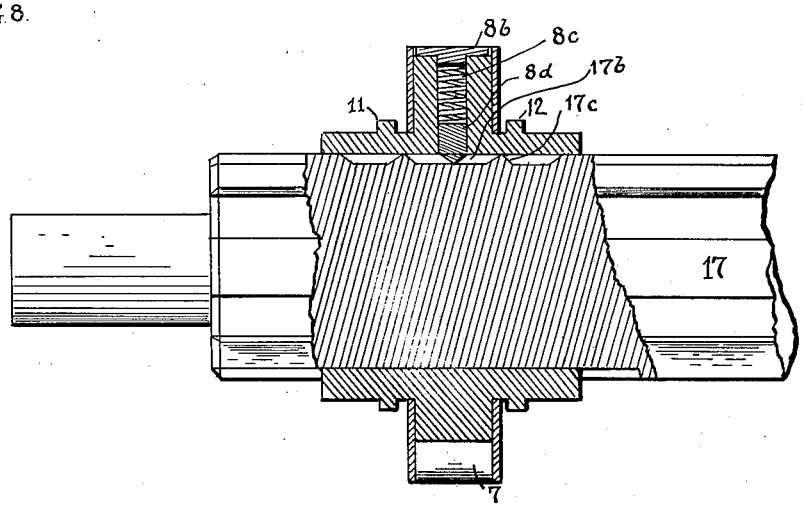
Figure 9:
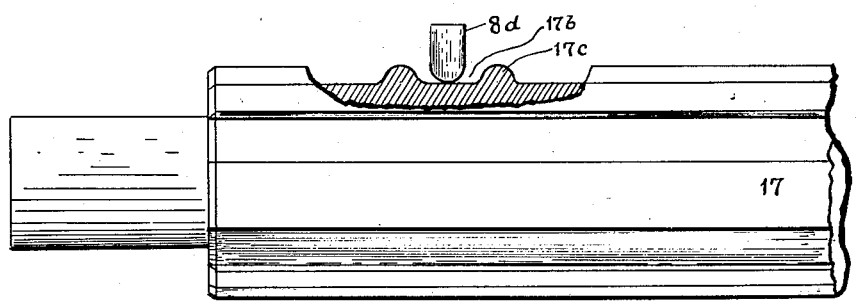

Fig. 8 shows that the push rods 8d may be entirely released after passing over the humps 17c to press the shoes 8b on the inside of the ring 6, so that rings 6 and 8 rotate with the same speed, and this entire release should take place substantially prior to the meshing of the respective tooth means on the shiftable unit and on the drive or driven shaft. In Fig. 8 I construct an unround sloping surface on the lower end of said push rods 8d, and in Fig. 9 I show that they may have round heads sliding over rounded humps on the shaft 17.

In Fig. 1, 1 is the fulcrum for the gear lever 32 shown in Fig. 5. 2 is the shifting jaw on the gear shift shaft 3, to engage the lower end of gear shift lever 32. This jaw carries a gear shift arm, and fork, 4 and 5. This fork engages a groove 5a on the shiftable clutch units 6, 7, 8. The outer ring 6, has an inside clutch member 6a to the left and one to the right 6b, respectively to be meshed with clutch teeth on the clutch member 13 on the clutch shaft and the gear wheel 18, rotating freely with gear 20 on the transmission shaft 17. 7 are the rollers between said outer ring 6, and the inner core 8, splined on said transmission shaft. 9 are rings, which are held in place on opposite sides of the rollers 7 by two springs 10, which fit elastically in indentions made in said internal clutch members 6a and 6b, to prevent a longitudinal displacement between ring 6 and core 8 via the intermediate rollers 7.

11 and 12 are teeth or so called dog clutch elements to engage respectively the inner dog clutch elements 14 on the clutch shaft 16, and the internal dog clutch elements 19 on the gear wheel 18, 20, rotating freely on the transmission shaft 17.

22 is a ring attached to gear wheel 20 by the ring 21, to prevent longitudinal sliding of the gear wheel 20.

23 is the gear wheel on the transmission shaft, which slidably engages low gear 27 on the countershaft 30, or the reverse gear 25, which is rotated by gear wheel 26 on said countershaft. 24 is the gear shift fork, which shifts back and forth said gear wheel 23 by means of a second gear shift shaft 3a, behind the shaft 3, and actuated by the gear shift lever 32 in the same way as the shiftable clutch members 6a, 6b, 11, 12, as is well known in the art.

28 and 29 are gear wheels on the countershaft 30, to effect intermediate drive via said countershaft and gears 15 and 20, as is well known in the art.

In Fig. 2 the free wheel mechanism 6—12 of Fig. 1 is shown larger and in transverse action. The gear shift shaft 3 is located inside the jaw 2, which is connected by an arm 4, to the fork 5, running in a groove 5a of the ring 6. Between the core 8 and the ring 6, are three sets of rollers 7 of different diameter, which slide on an outer circular path, having as a center, the center of the core 8, and slide or roll towards the inside on curves, which have their center offset from the center of the core. These rollers are by preference pushed in counterclockwise direction into the wedges formed by said outer circle and said three eccentric curvatures, by means of sliding blocks 7a and springs 7b, resting on the extensions 8a of the core 8. These extensions 8a are provided with radial holes, in which are located friction blocks 8b, push rods 8d, and tough springs 8c therebetween. The rods 8d slide with their inner ends in three splines or grooves 17b, on the transmission shaft 17. As can be seen from Figure 3, these splines 17b have a limited length, in contradistinction to the splines 17a, (see Fig. 1), which run through from the left of the transmission shaft to the extreme right thereof (with the exception, if preferred, of the length located under gear wheel 20, to provide a greater bearing surface for said gear wheel 20).

The clutch teeth 6b are also shown in their relative position by means of single teeth at either side of an indention 8e, in the outer ring, to insert the core 8 inside the ring 6 and thereafter the rollers 7. The teeth 6a and 6b are broken away between said three places, as shown on either side of the ring 6, in order to show better the position of the rollers. Then the rings 9 are inserted on top of the rollers. These rings 9 may have indentions corresponding to the teeth of the clutch members 6a and 11 on the left side, and 6b and 12 on the right side, in order to insert them next to the rollers. The elastic rings 10 compressed and inserted next to said rings 9 keep them from sliding out. These rings 10 are split and hook into notches of the teeth of clutch members 6a and 6b, and expand into them outwardly.

The friction blocks 8b may have different forms. The upper one in Fig. 2 extends from the center pin to the left and right, as far as the width of the extensions 8a on the core 8. The right lower one is shown with the ends bent over said extension 8a, and provided at one side with a hole to anchor the spring 7b. The left lower one is shorter than the width of arm 8a of the core 8, and is sunk into it. The springs 8c have to be pretty tough, if the splines 17b are shallow, in order to obtain enough friction between the pieces 6 and 8b to speed up or to slow down the rotational speed of the clutch shaft 16, when the clutch pedal is depressed and the gear shift lever moved into conventional, or solid, second or high gear drive.

In Fig. 3, the splines 17b are shown deeper than in Fig. 4, and end into the surface of the shaft 17. The distance between high and second gear free wheel-position and high and second gear solid-drive, should be fairly long, otherwise the angle of the slopes 17c becomes too steep and the resistance offered by the push rods 8d and springs 8c will cause too much resistance in the gear shift lever, bringing the conventional drive into operation without gear clash, or speeding up of the motor by the accelerator. In Fig. 4 a modification of said construction is shown. The push rods 8d remain at the bottom of the splines 17b during neutral position and free wheel drive in high and second gear. The incline on the pushrods 8d is the same as the incline 17c in the splines 17b, and this construction, (like that in Fig. 3), makes the button 34 in the gear shift lever 32, together with the stops 37 superfluous, as these inclines 17c warn the operator that the proper position for free wheel drive is reached. In Fig. 4 the incline 17c ends on the other end into an abrupt drop, which causes, almost simultaneously with the gear mesh, less tension in the springs 8c, in order to effect less friction between parts 6 and 8b to effect a smoother mesh between clutch members 11 and 12 and clutch member 14 on shaft 16, and clutch member 19 on gear 20, respectively.

In Fig. 2, 12 splines (17a) are shown, of which however three 17b are limited and used to effect said explained quiet gear shift from free wheel position into solid drive position.

In case the operator wishes to see the gear position, the gear shift lever 32, can be provided with a central longitudinal hole 32a, in which operates a rod 35, ending into a button 34. A spring 34a, located between said button 34 and the knob 33, pushes this rod constantly upwards. The rod 35 ends at its lower end into two arms 36, which limit the gear shift lever only to the 2 free wheel positions. When the button 34 is depressed by hand, the arms 36 are depressed below the abutments 37, and allow the operator to move into the 2 conventional drives. However, as explained, the additional arrangement of the frictional means 8b, 8c, 8d and inclines 17c make this arrangement superfluous even for careless drivers and too careful drivers.

In Fig. 6, the 3 positions of the gear wheel 23 are shown, and the 5 positions of the clutch unit 6, 7, 8.

The operation of the device, in practice, is as follows. From the foregoing description it is evident, that the gear shift in low and reverse is as in any other car, i. e. the clutch should be used for the gear shift. For the shift from neutral and towards neutral to and from the two free wheel positions, the use of the clutch is superfluous, due to the free wheel between shaft 17 and shaft 16 (gears 20, 28, 29, 15 all belong to shaft 16, on account of constant mesh between them), provided the gas pedal is used instead of the clutch. Like any other clutch operation the shafts 17 and 16 are released from each other by said free wheel, by throttling the gas. If the motor decreases its speed below that of the car, or shaft 17, motor and car are loose from each other, like in any standard car, in which the clutch releases the car from the motor.

The clutch member 6b, when in neutral and the car is moving, has to be decreased in rotational speed, when to be meshed with clutch member 18, when the motor is idling, the gas being shut off, (provided the car has more speed than the relative idling speed of the engine).

Equally when shifting from neutral into high, the clutch member 6a has to be decreased in speed, to mesh clutch member 13, when the motor is idling, the gas being shut off. If the clutch members 13 and 6a are meshed, and the operator wishes to go into second, the ring 6 is first decreased in speed, when the gas is shut off, and gears 15, 29, 28, 20 decrease equally in speed. But gear wheel 20 retains, however, a slower speed than gear wheel 15 so that when shifting from high into second, the ring 6 has to be decreased in speed to mesh clutch member 6b with clutch member 18.

Reversely, when shifting from second into high, past neutral, the friction in the free wheel forces temporarily the ring 6 in the same rotational speed as the transmission shaft 17, when the car is moving, and has to be decreased in speed somewhat to mesh clutch member 6a with clutch member 13, unless a quick shift is made. The ring 6, having comparatively little weight, changes its rotational speed according to its gear shift so easy, that the rubbing of the clutch member 6a, 6b with clutch member 13 and 18, prior to the actual mesh, effects more or less a silent shift, without the use of any additional frictional means, between ring 6 and core 8, but the friction provided by the rollers 7.

In the present arrangement of Figs. 1–4, the gear shift to free wheel position can be made by the use of the clutch only, or the use of the throttle 47 only, or both, as desired. However, when shifting immediately from neutral into the solid drives, or from one solid drive into the other, a silent shift can be made under any condition of speed of the car or motor (gas throttle on steering wheel), due to the additional frictional means explained before. When the clutch pedal is depressed the shaft 16 is released from the motor, and the lever 32, when shifted directly into solid gear, speeds up or retards the speed of shaft 15 or 17 according to the relative speed of the car, by means of parts 8b, 8c, 8d, and splines 17b and ridges 17c prior to the actual mesh of clutch members 14 and 11, or 12 and 19. In other words, when using the clutch the free wheel positions can be passed, as if they did not exist, which is not possible when said parts 8b, 8c, 8d, 17b, 17c are not applied.

If the rollers 7 and blocks 7a and springs 7b did not create a friction between 6 and 8, no gear shift could be made from neutral position into free wheel (or solid drive) in high or second, when the car is moving at a fair rate of speed, as the rotational speed of ring 6, not rotating, and clutch members 13 and 18, would differ too much, unless the clutch is used to decrease the speed of shaft 16. The friction of the rollers 7 effects for that reason quicker intermeshable peripheral speed, than when said ring 6 had no rotational speed at all, when the car is speeding (moving).

Finally the attention is directed to the motor, or prime mover shown in Fig. 7. The clutch pedal 42 is connected by means of rod 43, and fulcrum 41 of rod 43a with the throttle lever 44, operating the throttle 40. If the clutch pedal is depressed the throttle 40 is closed. The rod 44 has a stop 45, which slides in an eye of the rod 43a, which allows the operator to close the throttle every time the pedal 42 is depressed and to open it fully every time the pedal 42 comes back. The spring 46 pushes the throttle 40 always to open position. This throttle is independent of the ordinary throttle 47 to regulate the speed of the motor. Patent 1,541,240 shows another way to close a single throttle by the clutch pedal, independent of the regular operation of said throttle to regulate the engine speed. This additional feature is optional, of course, for the construction shown in the other figures in this application and in said patent. It makes the gear shift into the solid drives simpler, as the throttle 47 can remain in the condition, in which it was prior to the shift.

It is understood that the inclines in the splines 17c and 17d may be varied to obtain the best effect. If these inclines become less steep, the shift from free wheel position into solid position becomes longer. The spline 17d can be made as deep as the spline 17b in order to relieve the tension in the springs 8c entirely a little before, or practically simultaneously with the clutch engagement. It is understood that in the modification of Fig. 4, the various indentions indicated by 17b and 17d and further by the capital letters HC, HF, N, IF, IC, may be placed closer together, so that the synchromesh means acts twice, once for the free wheel position and once for the solid gear position, as already shown and explained in my previous application No. 493,458 of Nov. 4, 1930.

I claim:

1. An overrunning clutch slidable on a shaft but rotating therewith, composed of three parts, an outer ring, an inner ring, an overrunning clutch between the two rings, and a friction clutch between said two rings, said friction clutch being operated upon movement of said clutch on said shaft.

2. In a power transmission, two shafts aligned with each other, an overrunning clutch operating between said two shafts, a friction clutch associated with and between the overrunning parts of said clutch, dog clutches on one of said shafts and on said overrunning clutch to connect said clutch and shaft solidly when shifted in one direction, said friction clutch synchronizing said shaft and clutch prior to connecting them solidly by said unidirectional shift.

3. The combination of claim 2, in which said friction clutch consists of an outer and an inner ring, and elastic members between the two, and in which said friction clutch is operated by driving said elastic members outwardly from the inner ring of said overrunning clutch towards the outer ring thereof thereby producing an increasing friction between said two parts.

4. The combination of two aligned shafts, one having a bearing in the other concentrically, an outer member on one shaft, another inner member on said other shaft, elastic members between said two members, a friction shoe on the outer periphery of said inner member, said friction shoe pushed radially outwards by a push rod and said elastic member between said push rod and said friction shoe upon a shift, said friction shoe sliding upon the inside of said outer member.

5. The combination of two aligned shafts, one having concentrically a bearing in the other, one shaft having an external clutch member and an internal clutch member, a friction clutch effective upon a shift and slidable on said other shaft and composed of an outer member and an inner member splined on said other shaft, said outer member provided with an inner clutch member slidable into engagement with the external clutch member on said first shaft.

6. The combination of an overrunning clutch and a friction clutch, comprising an outer member and an inner member, means between the two to operate said friction clutch simultaneously with the overrunning between said outer and inner members upon a shift of both of said two clutches on a shaft.

7. Power transmission mechanism comprising a drive member, a driven member on a driven shaft, means associated with said members for establishing an overrunning drive there-between, said means comprising interengageable teeth, said driven member having interengageable teeth for establishing a two-way drive between said members, instrumentalities for synchronizing the teeth of each of said means immediately prior to interengagement, and means for releasing partially said synchronizing instrumentalities upon each of said interengagements.

8. The combination of claim 7, in which said last means are associated with and form part of a member on said driven shaft.

9. Power transmitting mechanism comprising movable drive and driven members on a driven shaft, clutch means associated with said members and engageable to synchronize said members, one of said members having teeth, said driven member comprising a part splined on said driven shaft rotatable with and translatable relative to the other member and having teeth engageable with the aforesaid teeth without clashing upon engagement of said clutch means to establish a drive connection between said members, means for translating said part toward said one member, the said clutch means being yieldable upon engagement of the teeth of said part to continue into engagement with the teeth of said one member, and means for partially releasing said clutch means upon synchronization of said members, so that said teeth on said part and member are able to shift their position slightly to effect said engagement properly and a free wheel operating between said drive and driven members before said synchronization starts.

10. Power transmission mechanism comprising relatively movable drive and driven members, said driven members on a driven shaft, clutch means associated with said members and engageable to synchronize said members, one of said members having teeth, said driven member comprising a part splined on said driven shaft and rotatable therewith and translatable relative to the other member and having teeth engageable with the aforesaid teeth without clashing upon engagement of said clutch means to establish a drive connection between said members, means for translating said part toward said one member, the said clutch means being yieldable upon engagement with the teeth of said part to continue into engagement with the teeth of said one member, and means for releasing said clutch upon synchronization of said mmbers, so that the teeth to be engaged are able to shift their radial position slightly to properly effect said engagement, and an overrunning clutch operating between said drive and driven members before said synchronization can start.

11. The combination of claim 10, in which said last means are associated with and cooperative with said part splined on said driven shaft.

12. The combination of claim 10, in which said last means consisting of spring-pressed poppets translatable with said part on said driven shaft.

13. Power transmitting mechanism comprising relatively movable drive and driven members and an overrunning clutch operative between said drive and driven members, said last member on a driven shaft, clutch means associated with said members and engageable to synchronize said members having teeth, said driven member comprising a part splined on said driven shaft rotatable with and translatable relative to the other member and having teeth engageable with the aforesaid teeth of said driven member without clashing upon engagement of said clutch means to establish a drive connection between said members, means for translating said part toward said one member, the last mentioned means being yieldable upon engagement of said clutch means to enable the teeth of said part to continue into engagement with the teeth of said one member, and means constructed and arranged for automatically releasing said clutch means upon synchronization of said members.

14. The combination of claim 13, in which said last means are operative between said part splined on said driven shaft and said driven shaft itself.

15. Power transmitting mechanism comprising first and second drive members and an intermediate driven element splined to a driven shaft having a bearing in said first drive member, clutch means associated with said members and element and engageable to synchronize selectively either member with said element, said element having clutch means to establish a drive connection selectively between either member and said element, means for translating said part towards either member, the last mentioned clutch means being yieldable upon engagement of said clutch means to enable the teeth of said part to continue into engagement with the teeth of either member, and means for returning said element to a position of neutrality relative to said members when either drive connection is effected, and an overrunning clutch operating between said drive member and driven element before said synchronization starts.

16. The combination of claim 15, in which said last means are associated with and cooperative between said element and splined on said driven shaft.

17. Power transmission mechanism including driving and driven members, shiftable means for establishing an overrunning drive between said members, said shiftable means consisting of one member having tooth means to engage tooth means on said driving members to establish an overrunning drive between said members, and consisting of another member having tooth means to engage tooth means on said driving members and operable by a further shift in the same direction for establishing a two-way drive between said members, means for synchronizing said tooth means immediately prior to their interengagement.

18. The combination of claim 17 in combination with means for releasing the synchronizing means prior to the engagement of said latter tooth means for a two-way-drive between said drive and driven members.

19. The combination of claim 17 in combination with means for releasing the synchronizing means prior to engagement of said tooth means effecting a two-way drive between said drive and driven members, said latter means associated and cooperative between said one member having tooth means establishing the two-way drive and said means for synchronizing said tooth means.

20. Power transmission mechanism including a drive member, a driven member and an overrunning clutch operating between the two when in driving relation, toothed clutch means associated with said members for establishing a direct drive between said members, means for synchronizing said tooth means immediately prior to their interengagement, and means for releasing the synchronizing means prior to engagement of said tooth means, said synchronizing tooth means being splined on and rotatable with said driven member and translatable thereon.

J. A. H. BARKEIJ.